US012775654B2

(12) United States Patent
Ustyuzhanin et al.

(10) Patent No.: US 12,775,654 B2
(45) Date of Patent: Oct. 27, 2026

(54) SYSTEM AND METHOD DATABASE GENERATION FOR AUTOMATED SCIENTIFIC INQUIRY USING MACHINE LEARNING

(71) Applicants: Constructor Technology AG, Schaffhausen (CH); Constructor Education and Research Genossenschaft, Schaffhausen (CH)

(72) Inventors: Andrey Ustyuzhanin, Singapore (SG); Alexander Tormasov, Busingen am Hochrhein (DE); Serg Bell, Singapore (SG); Stanislav Protasov, Singapore (SG); Artem Maevskiy, Singapore (SG); Sergey Ulasen, Singapore (SG); Vasyl Shandyba, Dnipro (UA)

(73) Assignee: Constructor Technology AG, Schaffhausen (CH)

( * ) Notice: Subject to any disclaimer, the term of this patent is extended or adjusted under 35 U.S.C. 154(b) by 0 days.

(21) Appl. No.: 19/049,352

(22) Filed: Feb. 10, 2025

(65) Prior Publication Data

US 2025/0258855 A1 Aug. 14, 2025

Related U.S. Application Data

(60) Provisional application No. 63/552,174, filed on Feb. 11, 2024.

(51) Int. Cl.
*G06F 16/34* (2025.01)
*G06F 16/332* (2025.01)
(Continued)

(52) U.S. Cl.
CPC .......... *G06F 16/34* (2019.01); *G06F 16/3322* (2019.01); *G06F 16/338* (2019.01);
(Continued)

(58) Field of Classification Search
CPC .... G06F 16/34; G06F 16/3322; G06F 16/353; G06F 16/367; G06F 16/35; G06F 16/338; G06F 40/20
(Continued)

(56) References Cited

U.S. PATENT DOCUMENTS

2007/0018953 A1* 1/2007 Kipersztok ......... G06F 16/3329 707/E17.067
2013/0262449 A1* 10/2013 Arroyo ............... G06F 16/2453 707/722
(Continued)

*Primary Examiner* — Shahid A Alam
(74) *Attorney, Agent, or Firm* — ArentFox Schiff LLP; Michael Fainberg

(57) ABSTRACT

A system receives a plurality of scientific documents for inclusion in an extended knowledge graph. For each respective scientific document of the plurality of scientific documents, the system classifies the respective scientific document with a theoretical framework of a plurality of theoretical frameworks each comprising terms and principles associated with a particular scientific topic, extracts metainformation of the respective scientific document, structures the metainformation in a document-specific ontology model that further comprises an indication of the theoretical framework, generates a plurality of text chunks from the respective scientific document of a given size, and generates, using a first ML model, one or more concepts from each of the plurality of text chunks. The system generates, using a second ML model, the extended knowledge graph using each of the plurality of text chunks, each concept, and the metainformation, and stores the extended knowledge graph in a graph document database.

19 Claims, 11 Drawing Sheets

300

(51) Int. Cl.

| | |
|---|---|
| ***G06F 16/338*** | (2019.01) |
| ***G06F 16/35*** | (2025.01) |
| ***G06F 16/353*** | (2025.01) |
| ***G06F 16/36*** | (2019.01) |
| ***G06F 40/20*** | (2020.01) |

(52) U.S. Cl.
CPC ............ *G06F 16/35* (2019.01); *G06F 16/353* (2019.01); *G06F 16/367* (2019.01); *G06F 40/20* (2020.01)

(58) Field of Classification Search
USPC .......................................................... 707/722
See application file for complete search history.

(56) References Cited

U.S. PATENT DOCUMENTS

2022/0261668 A1* 8/2022 Stumpe ............. G06F 16/24578
2024/0354567 A1* 10/2024 Duggal .................. G06N 3/006
2024/0394563 A1* 11/2024 Sheward ............... G06F 3/0482

* cited by examiner

700

800

1000

SYSTEM AND METHOD DATABASE GENERATION FOR AUTOMATED SCIENTIFIC INQUIRY USING MACHINE LEARNING

CROSS-REFERENCE TO RELATED APPLICATIONS

This application claims the benefit of U.S. Provisional Application No. 63/552,174, filed Feb. 11, 2024, which is herein incorporated by reference.

FIELD OF TECHNOLOGY

The present disclosure relates to the field of machine learning, and, more specifically, to systems and methods for hypothesis and research synthesis using machine learning.

BACKGROUND

The landscape of scientific research is inherently fragmented, with knowledge siloed within specific domains that are often minimally interconnected. This compartmentalization severely limits the scope of inquiry and the potential for innovative discoveries. As problems within individual domains grow more complex, finding solutions using traditional, domain-contained methods becomes increasingly challenging. The advancement of science and the resolution of novel problems, therefore, necessitate looking beyond the confines of single domains for inspiration, methodologies, or direct solutions that can be adapted or applied.

However, such cross-domain exploration is hindered by the high degree of specialization required to achieve proficiency in today's scientific disciplines. Researchers, while experts in their respective fields, rarely possess the broad expertise necessary to traverse and understand multiple domains effectively. This specialization creates barriers to integrative, interdisciplinary research crucial for addressing contemporary scientific and technological challenges. Earlier discoveries were made by accident. Now it is increasingly difficult, as it requires at least basic knowledge of developments in other fields. Currently, the chances for a researcher to be aware of useful developments are low.

SUMMARY

Systems and methods are disclosed for automating the initial phases of scientific inquiry and overcoming the limitations imposed by scientific specialization using machine learning.

Context generally refers to a scientific domain that has formed from the historical evolution of a branch of science, such as quantum chemistry, particle physics, or evolutionary biology. Formalism generally refers to a formal system of terms and techniques based on the scientific knowledge discovery method used to describe events and phenomena in a given scientific context, with formal concepts, axioms, and inference rules. This method can be used to represent scientific knowledge in a scientific context.

Aspects of the present disclosure provide a comprehensive machine learning (ML)-based tool, which will be referred to as "HypoFinder." The tool automates critical components of the research initiation phase. These components include mining semantic metainformation from scientific papers to extract information on scientific context, formalism and method used, as well as achieved results.

Scientific context and formalism selection takes place when HypoFinder automatically identifies and selects the appropriate scientific contexts and formalisms based on the user's research query, ensuring a solid foundation for hypothesis formulation. Hypotheses are generated by employing prompting and reasoning technologies for harnessing large language models. HypoFinder generates viable and innovative hypotheses for researchers to explore based on the analysis of existing literature and data.

Automated research synthesis is implemented when the tool conducts an automated background search by extracting and summarizing relevant semantic information from a curated body of scholarly articles-thus providing researchers with a succinct overview of the current state of knowledge in a selected field.

In one exemplary aspect, the techniques described herein relate to a method for hypothesis and research synthesis using machine learning, the method including: receiving a user query requesting a testable hypothesis about a scientific topic; classifying the user query into a first theoretical framework of a plurality of theoretical frameworks each including of terms and principles related to a particular scientific topic; generating the testable hypothesis by a first machine learning (ML) model that is configured to: receive as inputs: the user query, the first theoretical framework, and information from a graph document database including data associated with scientific documents; generate, as an output, the testable hypothesis that can be evaluated using the first theoretical framework and that does not reiterate a hypothesis or findings from the scientific documents in the graph document database; outputting the testable hypothesis via a user interface in response to the user query.

In some aspects, the techniques described herein relate to a method, further including: generating a summary of related works using a second ML model that parses the data associated with the scientific documents in the graph document database, wherein the summary of related works includes hypotheses and research plans or/and methods described in the scientific documents related to the testable hypothesis; and outputting the summary of related works on the user interface.

In some aspects, the techniques described herein relate to a method, further including: generating a research plan for testing the testable hypothesis using a third ML model that receives, as inputs, the summary of related works and the testable hypothesis, and generates, as an output, the research plan including a procedure and techniques for testing the testable hypothesis; and outputting the research plan on the user interface.

In some aspects, the techniques described herein relate to a method, wherein the research plan further includes a list of literature to support or refute the testable hypothesis.

In some aspects, the techniques described herein relate to a method, wherein the testable hypothesis further includes one or more of: a mathematical model, software code, a code library, at least one parameter of materials or elements, and at least one example of a practical application.

In some aspects, the techniques described herein relate to a method, wherein the first ML model is a large language model configured to access the graph document database using Graph Retrieval Augmented Generation (G-RAG).

In some aspects, the techniques described herein relate to a method, wherein the first ML model is trained using a training dataset including a plurality of user queries and corresponding hypotheses that are novel relative to historical scientific documents in a training graph document database.

In some aspects, the techniques described herein relate to a method, wherein the graph document database is periodically updated with newer scientific documents.

In some aspects, the techniques described herein relate to a system for hypothesis and research synthesis using machine learning, including: at least one memory; at least one hardware processor coupled with the at least one memory and configured, individually or in combination, to: receive a user query requesting a testable hypothesis about a scientific topic; classify the user query into a first theoretical framework of a plurality of theoretical frameworks each including of terms and principles related to a particular scientific topic; generate the testable hypothesis by a first machine learning (ML) model that is configured to: receive as inputs: the user query, the first theoretical framework, and information from a graph document database including data associated with scientific documents; generate, as an output, the testable hypothesis that can be evaluated using the first theoretical framework and that does not reiterate a hypothesis or findings from the scientific documents in the graph document database; output the testable hypothesis via a user interface in response to the user query.

In some aspects, the techniques described herein relate to a non-transitory computer readable medium storing thereon computer executable instructions for hypothesis and research synthesis using machine learning, including instructions for: receiving a user query requesting a testable hypothesis about a scientific topic; classifying the user query into a first theoretical framework of a plurality of theoretical frameworks each including of terms and principles related to a particular scientific topic; generating the testable hypothesis by a first machine learning (ML) model that is configured to: receive as inputs: the user query, the first theoretical framework, and information from a graph document database including data associated with scientific documents; generate, as an output, the testable hypothesis that can be evaluated using the first theoretical framework and that does not reiterate a hypothesis or findings from the scientific documents in the graph document database; outputting the testable hypothesis via a user interface in response to the user query.

In some aspects, the techniques described herein relate to a method for database generation for automated scientific inquiry using machine learning (ML), the method including: receiving a plurality of scientific documents for inclusion in an extended knowledge graph; for each respective scientific document of the plurality of scientific documents: classifying the respective scientific document with a theoretical framework of a plurality of theoretical frameworks each including terms and principles associated with a particular scientific topic; extracting metainformation of the respective scientific document; structuring the metainformation in a document-specific ontology model that further includes an indication of the theoretical framework; generating a plurality of text chunks from the respective scientific document of a given size; generating, using a first ML model, one or more concepts from each of the plurality of text chunks; generating, using a second ML model, the extended knowledge graph using each of the plurality of text chunks, each concept, and the metainformation; and storing the extended knowledge graph in a graph document database.

In some aspects, the techniques described herein relate to a method, wherein nodes of the extended knowledge graph include each of the plurality of text chunks, each concept, and the metainformation, and wherein relationships captured in each document-specific ontology model are mapped to edges of the extended knowledge graph.

In some aspects, the techniques described herein relate to a method, further including: performing hierarchical clustering on the extended knowledge graph to identify a plurality of community structures, wherein a community structure is a group of nodes densely connected to each other but sparsely connected to other densely connected nodes in a graph.

In some aspects, the techniques described herein relate to a method, further including: generating, by a third ML model, a summary for each community structure of the plurality of community structures, wherein the summary is indicative of entities in a given community structure and relationships within the given community structure; storing each summary in the graph document database.

In some aspects, the techniques described herein relate to a method, wherein a large language model (LLM), configured to answer user queries, accesses content of the extended knowledge graph when generating responses.

In some aspects, the techniques described herein relate to a method, wherein the LLM utilizes Retrieval Augmented Generation (RAG) to access the content.

In some aspects, the techniques described herein relate to a method, further including: de-duplicating matching concepts between multiple scientific documents of the plurality of scientific documents using shared reference dataset.

In some aspects, the techniques described herein relate to a method, wherein the first ML model and the second ML model are each large language models.

In some aspects, the techniques described herein relate to a method, wherein the metainformation of the scientific document is extracted using a fourth ML model.

In some aspects, the techniques described herein relate to a system for database generation for automated scientific inquiry using machine learning (ML), including: at least one memory; at least one hardware processor coupled with the at least one memory and configured, individually or in combination, to: receive a plurality of scientific documents for inclusion in an extended knowledge graph; for each respective scientific document of the plurality of scientific documents: classify the respective scientific document with a theoretical framework of a plurality of theoretical frameworks each including terms and principles associated with a particular scientific topic; extract metainformation of the respective scientific document; structure the metainformation in a document-specific ontology model that further includes an indication of the theoretical framework; generate a plurality of text chunks from the respective scientific document of a given size; generate, using a first ML model, one or more concepts from each of the plurality of text chunks; generate, using a second ML model, the extended knowledge graph using each of the plurality of text chunks, each concept, and the metainformation; and store the extended knowledge graph in a graph document database.

In some aspects, the techniques described herein relate to a non-transitory computer readable medium storing thereon computer executable instructions for database generation for automated scientific inquiry using machine learning (ML), including instructions for: receiving a plurality of scientific documents for inclusion in an extended knowledge graph; for each respective scientific document of the plurality of scientific documents: classifying the respective scientific document with a theoretical framework of a plurality of theoretical frameworks each including terms and principles associated with a particular scientific topic; extracting metainformation of the respective scientific document; structuring the metainformation in a document-specific ontology model that further includes an indication of the theoretical framework; generating a plurality of text chunks from the respective scientific document of a given size; generating, using a first ML model, one or more concepts from each of the plurality of text chunks; generating, using a second ML model, the extended knowledge graph using each of the plurality of text chunks, each concept, and the metainformation; and storing the extended knowledge graph in a graph document database.

It should be noted that the methods described above may be implemented in a system comprising at least one hardware processor and memory. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for hypothesis and research synthesis using machine learning. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

System components comprise the following elements. A database is linked to a hypothesis finder (also referred to as HypoFinder) including content of interest. In an exemplary embodiment, the content comprises scholarly articles and scientific publications. The database is preferably updated regularly to ensure access to current and foundational literature. The database also includes semantic paper metainformation used for mining scientific contexts and formalism based on a paper citation graph. Further content includes internal semantic paper structure comprising problem formulation, scientific context, formalism, suggested method, metric for result assessment, etc.

Paper semantic metainformation is collected using LLM-assisted information extraction using prompting, based on a template matching technique and partially validated using human assessments. The system integrates LLM technology capable of understanding complex scientific queries, performing literature analysis, and generating hypotheses that can be reviewed and validated by the user. HypoFinder features a user interface, such as a graphical user interface (GUI) or command line interface (CLI) that allows researchers to input queries, receive suggestions, and review synthesized artifacts.

Figure 1:
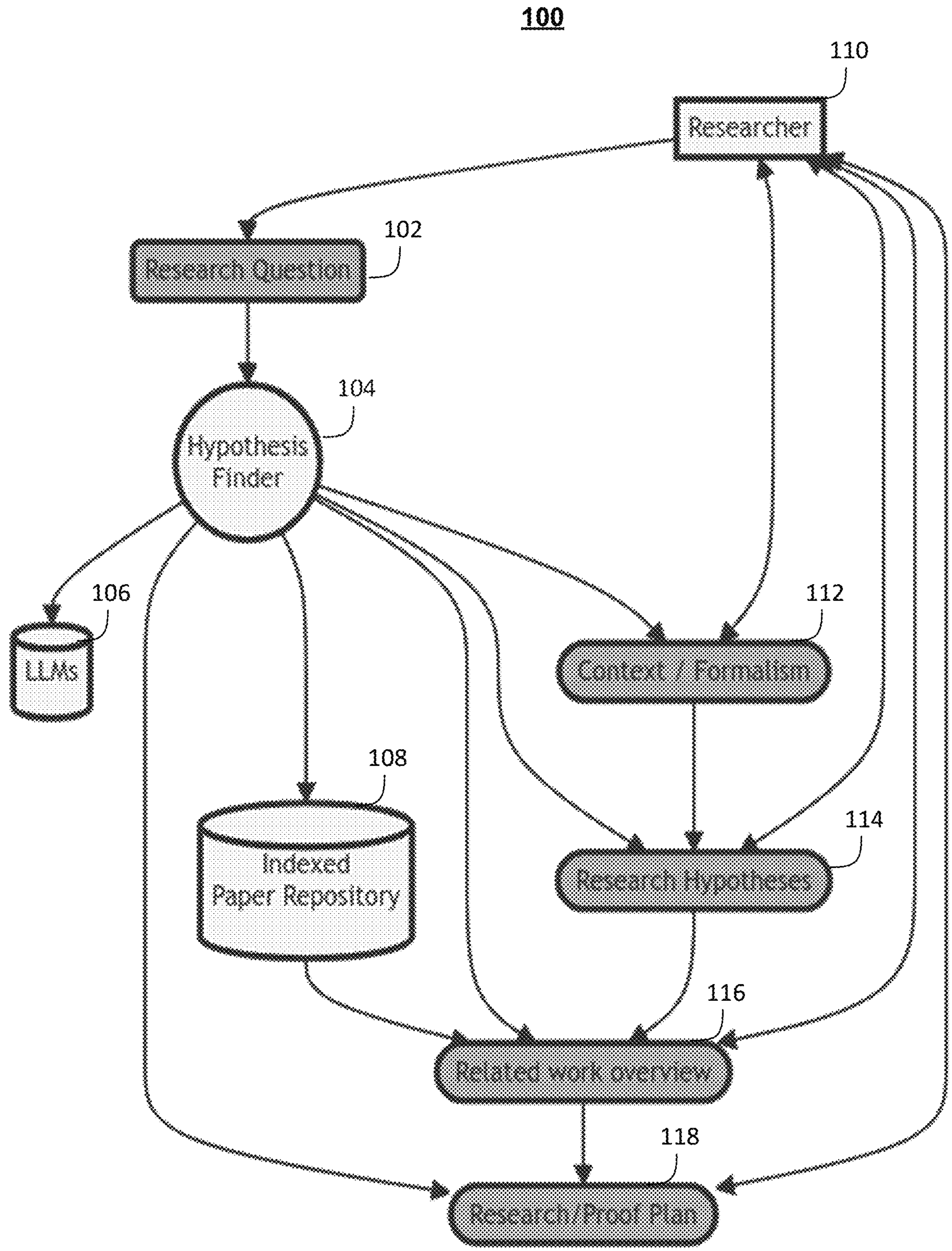
FIG. 1 is a block diagram illustrating a system for executing HypoFinder for hypothesis and research synthesis.

FIG. 1 is a block diagram illustrating system 100 for executing HypoFinder for hypothesis and research synthesis. System 100 may be implemented by computer system 20 described in FIG. 10.

An exemplary operational workflow comprises a series of steps substantially as follows. At an input phase, a user (typically a researcher 110) inputs an initial investigation query (e.g., research question 102) into HypoFinder 104. HypoFinder 104 analyzes the query and selects the optimal formalisms for structuring the research. Based on the selected formalism and a curated database, HypoFinder 104 generates potential hypotheses. Based on previous steps, content is selected (such as scholarly papers) relevant to the query and an overview is provided in a format adapted to the user's level of expertise. The tool automatically selects relevant literature to support or refute the generated hypotheses providing the user with research plan.

In an embodiment, metadata extraction and validation are accomplished through a series of steps. In some aspects, HypoFinder 104 constantly updates content (paper) metadata and extracts relevant pieces of information using an LLM template-based prompting technique to fill in one or more of the following fields: problem formulation, scientific context/formalism 112, suggested method, baseline methods, metric for result assessment, or results summary. HypoFinder 104 further researches generated hypotheses 114 and generates related work overview 116 using indexed paper repository 108.

Examples of formalisms are now provided:

Density Functional Theory (DFT): A quantum mechanical modeling framework used to investigate and predict properties of materials based on their atomic structure. DFT is particularly useful for calculating electronic structures and potential energy surfaces of materials.

Periodic Boundary Conditions (PBC): An approach that represents crystals as repeating supercells to study material properties. This framework allows researchers to analyze crystal properties under various conditions while capturing long-range atomic interactions.

Crystal Structure Prediction: A framework focused on understanding and predicting atomic arrangements in solid materials, often using Crystallographic Information File format for representing 3D structural data.

Molecular Dynamics (MD) Simulations: A theoretical framework used for predicting material properties like diffusivity in solid materials. These formalisms each have specific applications and constraints. For 2D materials, the frameworks must account for specific symmetry transformations that preserve atomic positions, such as rotations and reflections across symmetry axes.

When dealing with complex systems, these formalisms often need to account for both atomic-level structure and higher-level configurations like phase domains.

Each of these frameworks helps researchers understand different aspects of materials, from atomic structure to bulk properties, while working within specific computational and theoretical constraints.

In some aspects, HypoFinder 104 groups content into clusters of relevance to scientific context/formalism 112, mapping scientific domains and finding topological similarity between topical research and formalisms using graph-based similarity algorithms. HypoFinder 104 provides human-assisted verification and validation tools for correcting LLM-based attribution. Such human-verified information is used for fine-tuning of LLM models 106. HypoFinder 104 incorporates mechanisms for validating the generated hypotheses and the synthesized research outputs against a continuously updated and diversified corpus of scientific literature.

Ultimately, HypoFinder 104 provides an answer to research question 102 in the form of a research/proof plan 118, which can be used by researcher 110 to create a novel result to a scientific inquiry.

In an exemplary embodiment, document storage for content and metainformation is done using a database such as Vector DB. In an embodiment, the LLM utilizes Retrieval Augmented Generation (RAG). Despite being thoroughly trained, LLMs may present false information when they lack an answer or when the training data is static-leading to out-of-date or generic responses. Responses may come from non-authoritative sources. Terminology confusion can also result in inaccurate answers. RAG addresses these challenges by grounding the LLM on external knowledge sources. Instead of relying solely on its internal training data, the LLM references authoritative knowledge bases. RAG fetches context-specific data from external databases, ensuring up-to-date and accurate responses. RAG can extend LLM capabilities without retraining the model.

Figure 2:
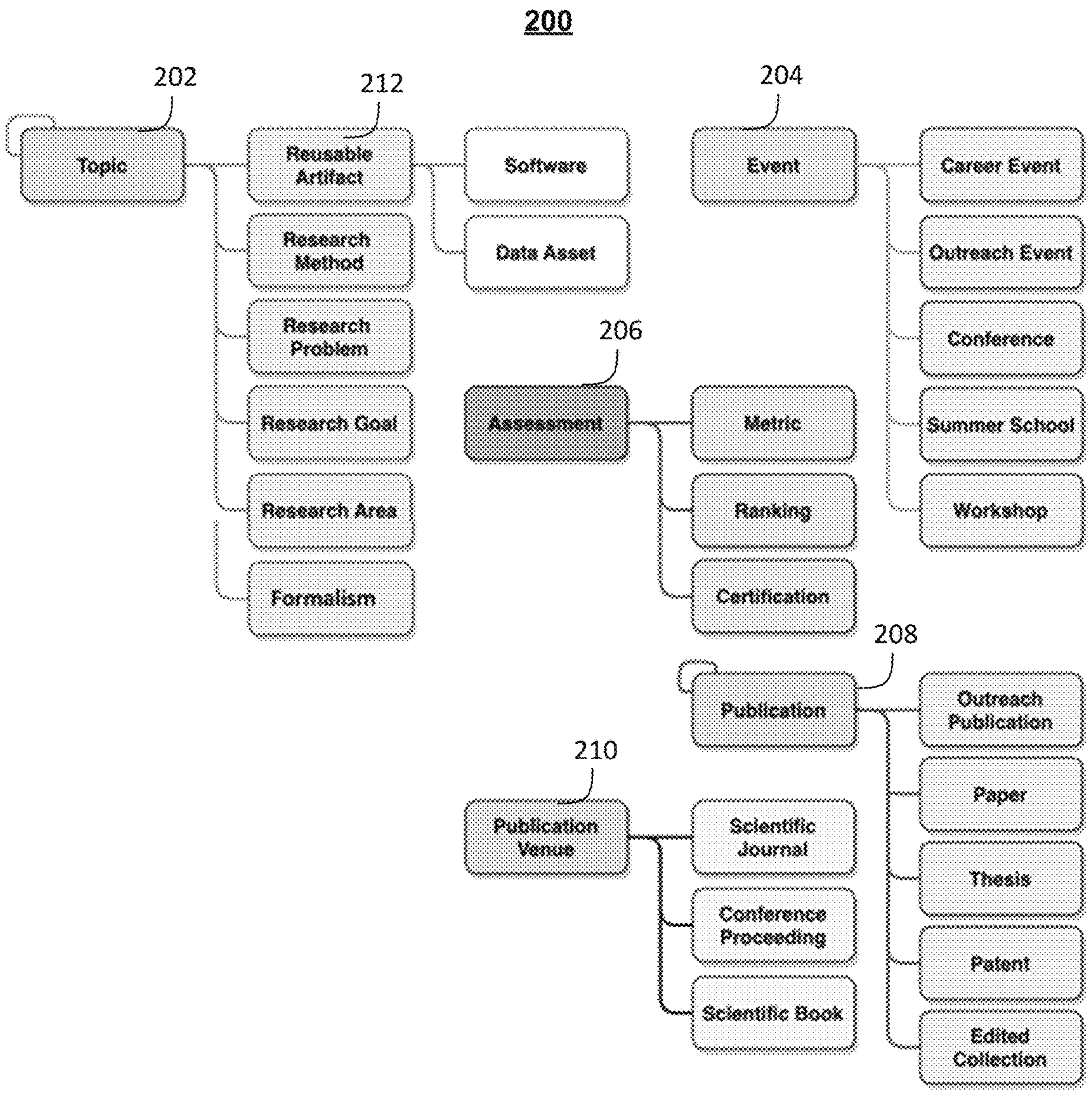
FIG. 2 is a diagram illustrating an example ontological model.

FIG. 2 is a diagram illustrating an example ontological model 200. As shown in model 200, there are multiple parent blocks such as topic 202, event 204, assessment 206, publication 208, and publication venue 210. Each parent block has one or more child blocks. For example, topic 202 has reusable artifact 212, research method, research problem, etc. It should be noted that certain child blocks have one or more child blocks of their own. For example, reusable artifact 212 has software and data asset blocks. This means that multiple parent-child nests can branch out from a single block. Ontological model 200 represents the information that is extracted from a given document (e.g., a publication) and the manner in which the information is organized and stored (e.g., in indexed paper repository 108).

Figure 3:
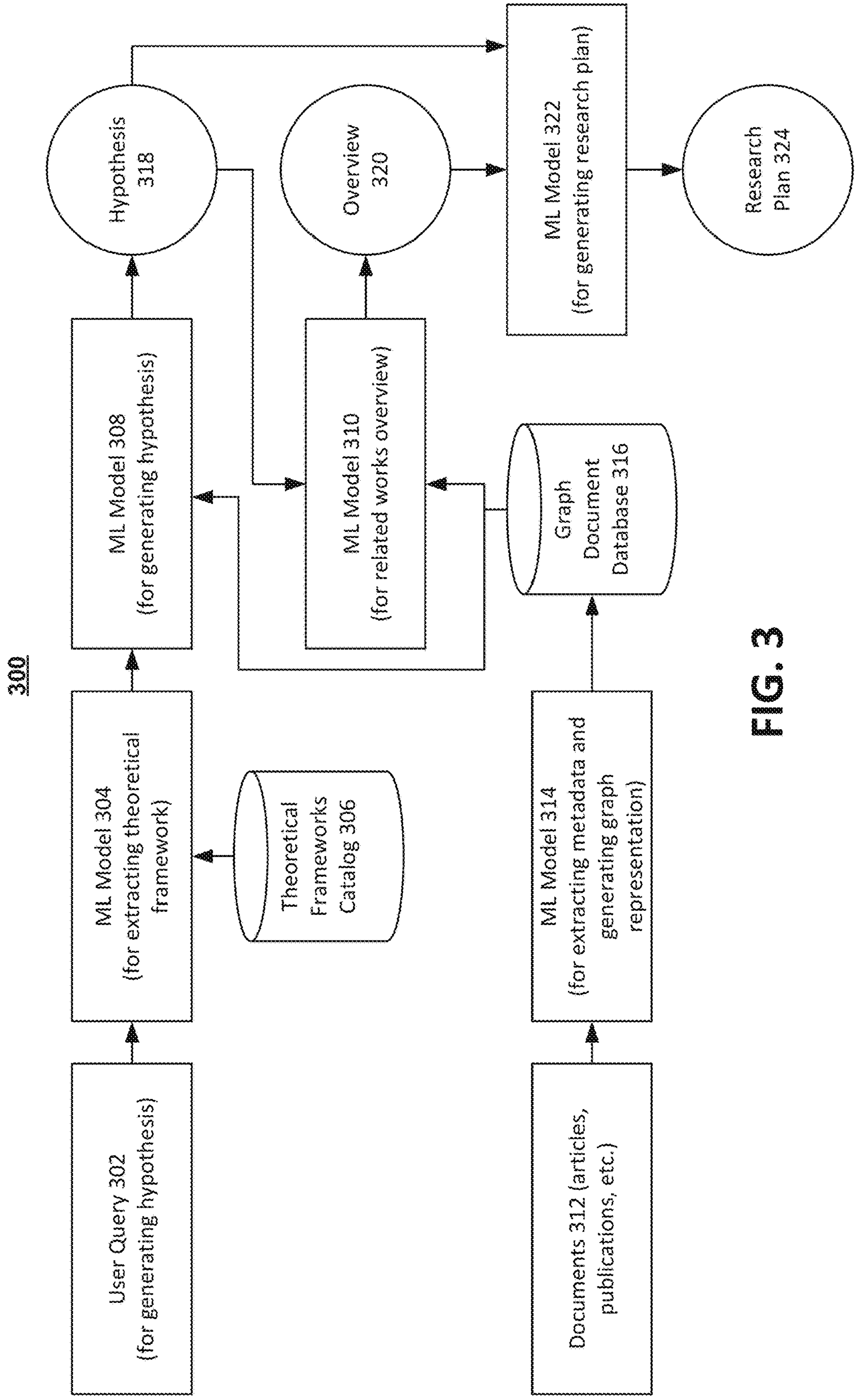
FIG. 3 illustrates a diagram of a system for hypothesis and research synthesis using machine learning.

FIG. 3 illustrates a diagram of a system 300 for hypothesis and research synthesis using machine learning. When a user inputs a query 302, such as a request to generate a hypothesis on a specific topic, the ML model 304 is activated to process this request. The model 304 is specifically configured to interact with a theoretical frameworks catalog 306, which houses a diverse collection of theoretical frameworks across various disciplines. For instance, if a researcher is exploring the impact of social media on mental health, the ML model 304 may extract relevant frameworks such as the Social Cognitive Theory or the Uses and Gratifications Theory from the catalog. In another example, if a researcher is investigating the efficiency of resource allocation in supply chain management, the ML model 304 may select the Linear Programming framework to formulate a hypothesis about optimal resource distribution. By selecting the most pertinent framework from the plurality available in catalog 306, the system ensures that the generated hypothesis is grounded in established theoretical constructs, thereby enhancing the robustness and relevance of the research synthesis process.

ML model 304 may be trained on a labeled dataset comprising various theoretical frameworks and corresponding research queries to learn the associations between different types of queries and suitable frameworks. ML model 304 may be a classifier that uses natural language processing techniques to classify user query 302.

ML model 314 is configured to process and extract metadata from a variety of documents 312, which may include academic articles, research publications, and other scholarly texts. This extraction process involves identifying key elements such as authorship, publication date, keywords, and thematic content, which are crucial for understanding the context and relevance of each document. Once the metadata is extracted, ML model 314 utilizes an ontological model 200 to transform the extracted information into a structured graph representation. This ontological model serves as a framework for defining the relationships and hierarchies between different concepts and entities within the documents. By mapping the extracted metadata onto this model, the ML model 314 creates a comprehensive graph document database 316. This database not only organizes the documents in a way that highlights their interconnections and thematic overlaps but also facilitates advanced querying and analysis.

ML model 308 is configured to generate hypothesis 318 based on user query 302 by integrating multiple sources of information: the user query 302, the identified theoretical framework, and the graph document database 316. When a user submits a query, the model first aligns it with a relevant theoretical framework, ensuring that the hypothesis is grounded in established academic principles. It then leverages the graph document database 316, which contains a rich network of interconnected documents and metadata, to extract pertinent data and insights that inform the hypothesis formulation. This process ensures that the generated hypothesis is not only theoretically sound but also contextually relevant and supported by existing literature.

Consider a user query 302 that asks, "How does the introduction of a new variable representing interspecies competition in a differential equation model affect the stability of its solutions in ecological systems?" In response, ML model 308 processes this query by aligning it with a relevant theoretical framework, such as the Lyapunov Stability Theory, which is used to analyze the stability of solutions in dynamic systems. By leveraging the graph document database 316, the model reviews existing literature on differential equations and ecological modeling, ensuring that the generated hypothesis is original and not a repetition of existing findings. As an output, the model formulates a testable hypothesis: "In ecological systems modeled by differential equations, the introduction of a variable representing interspecies competition enhances the stability of equilibrium solutions, as evaluated through Lyapunov functions, under conditions of limited resource availability." This hypothesis is crafted to be evaluated using the Lyapunov Stability Theory, providing a novel insight that extends beyond the hypotheses or conclusions documented in the scientific literature within the graph document database 316.

In some aspects, ML model 310 generates an overview 320 by scanning the graph document database 316. ML model 310 identifies similar hypotheses and related works to hypothesis 318, providing a comprehensive context for the new hypothesis. In some aspects, overview 320 may include an analysis of existing research trends, gaps, and corroborative studies, offering the user a detailed landscape of the current academic discourse surrounding the topic.

In some aspects, overview 320 and hypothesis 318 are input into ML model 322, which is configured to generate a research plan 324 for testing hypothesis 318. By examining the methodologies, tests, and procedures employed in these related studies identified in overview 320, ML model 322 identifies best practices and innovative approaches that can be adapted or replicated in the new research plan. This ensures that the plan is not only grounded in proven scientific methods but also tailored to address the unique aspects of hypothesis 318. The research plan 324 may include a detailed outline of experimental designs, data collection strategies, analytical techniques, and validation procedures, all of which are informed by the insights identified from overview 320.

In some aspects, ML model 322 is trained using a combination of supervised learning and reinforcement learning techniques. For example, ML model 322 may learn from a dataset of existing research plans and their corresponding hypotheses and overviews, allowing ML model 322 to learn the associations between hypotheses, related works, and effective research methodologies. Reinforcement learning may then be employed to refine the ability of ML model 322 to generate optimal research plans by providing feedback on the success and efficiency of the plans it produces, enabling iterative improvements in its planning capabilities.

In some aspects, ML model 304, ML model 308, ML model 310, ML model 314, and ML model 322 may each be large language models. In some aspects, all of these ML models may be part of one ML model configured to perform all of the individual tasks described above.

Figure 4:
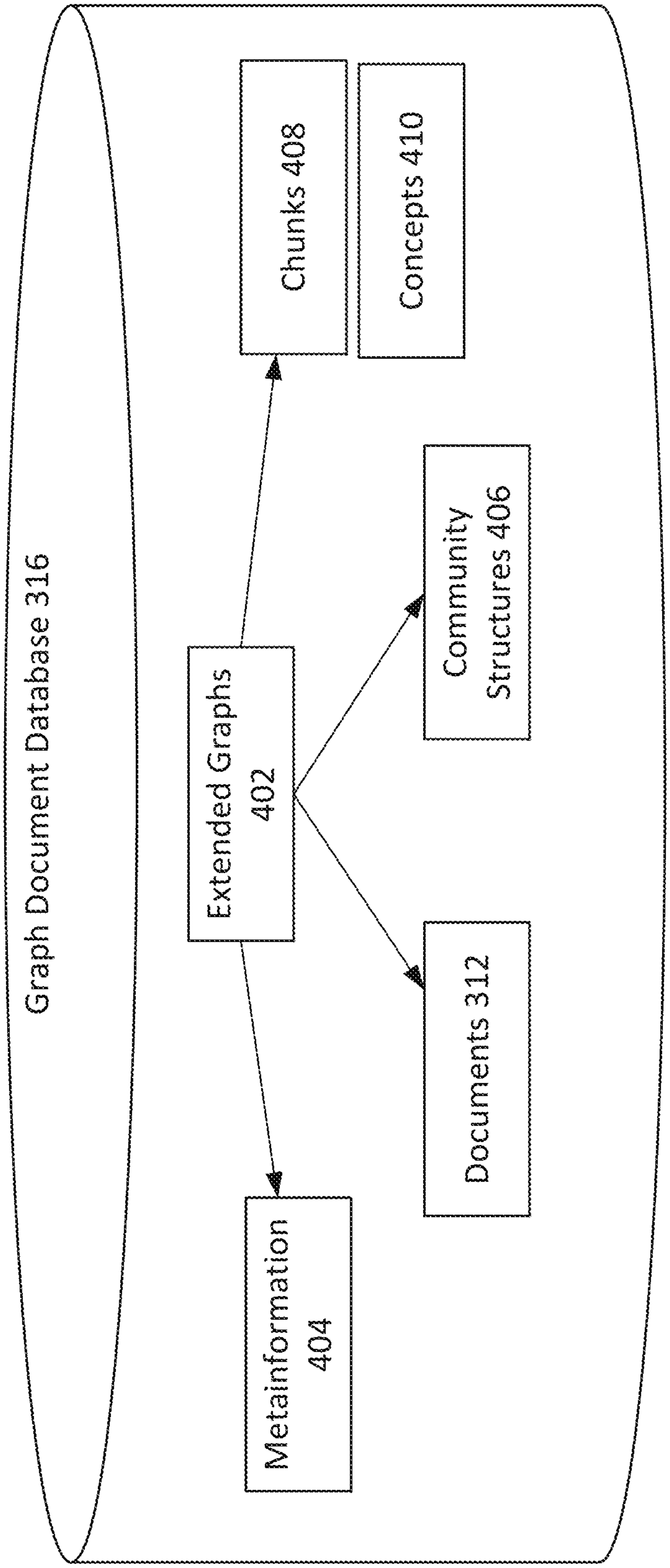
FIG. 4 illustrates a diagram of a graph document database.

FIG. 4 illustrates a diagram of a graph document database 316. As shown, graph document database 316 may include one or more extended graphs 402. Extended graphs 402 may include documents 312 along with metainformation 404 of documents 312. As will be discussed in greater detail, documents 312 may be split into chunks 408, each associated with a concept of concepts 410. Based on the closeness of branches in extended graphs 402, community structures 406 may be formed as well.

Figure 5:
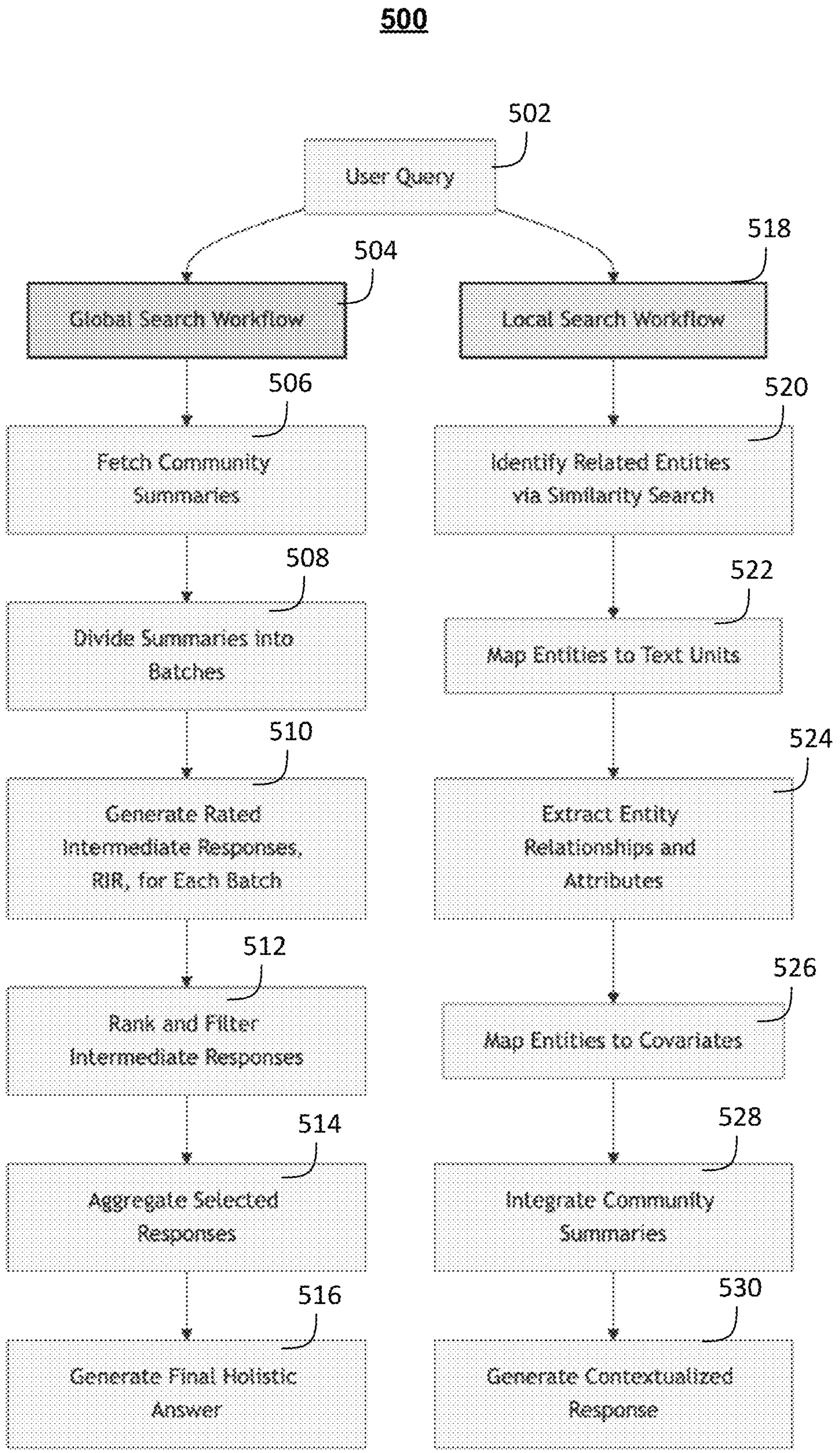
FIG. 5 illustrates a flow diagram for scientific database search workflows.

FIG. 5 illustrates a flow diagram 500 for scientific database search workflows. In particular, for user query 502 (same as user query 302), system 300 may execute either a global search workflow 504 or a local search workflow 518.

Global search workflow 504 is for reasoning about holistic questions related to the whole data corpus by leveraging the community summaries. Local search workflow 518 is for reasoning about specific entities by fanning out to their neighbors and associated concepts.

In the global search workflow, system 300 takes user query 502 and/or conversation history as the initial input. At 506, system 300 uses node community reports generated by an LLM from a specified level of the community hierarchy as context data. At 508, these community reports are shuffled and divided into multiple batches (Shuffled Community Report Batch 1, Batch 2 . . . Batch N).

At 510, each batch of community reports is further divided into predefined-sized text chunks. Each text chunk is used to generate an intermediate response. The response contains a list of information pieces called points. Each point has a numerical score indicating its importance. These generated intermediate responses are the Rated Intermediate Responses (Rated Intermediate Response 1, Response 2 . . . Response N).

At 512, system 300 ranks and filters these intermediate responses, selecting the most important points. At 514, the selected important points form the aggregated intermediate responses.

At 516, the aggregated intermediate responses are used as context to generate the final reply.

In local search workflow 518 (for when users ask questions about specific entities (such as names of people, places, organizations, etc.), at 520, system 300 identifies a set of entities from the knowledge graph that are semantically related to the user input. These entities serve as entry points into the knowledge graph. This step uses a vector database like Milvus to conduct text similarity searches.

At 522, the extracted text units are mapped to the corresponding entities, removing the original text information. At 524, system 300 extracts specific information about the entities and their corresponding relationships.

At 526, system 300 maps entities to their covariates, which may include statistical data or other relevant attributes. At 528, community reports are integrated into the search results, incorporating some global information. If provided, the system uses conversation history to better understand the user's intent and context.

At 530, system 300 constructs and responds to user query 502 based on the filtered and sorted data generated in the previous steps.

Figure 6:
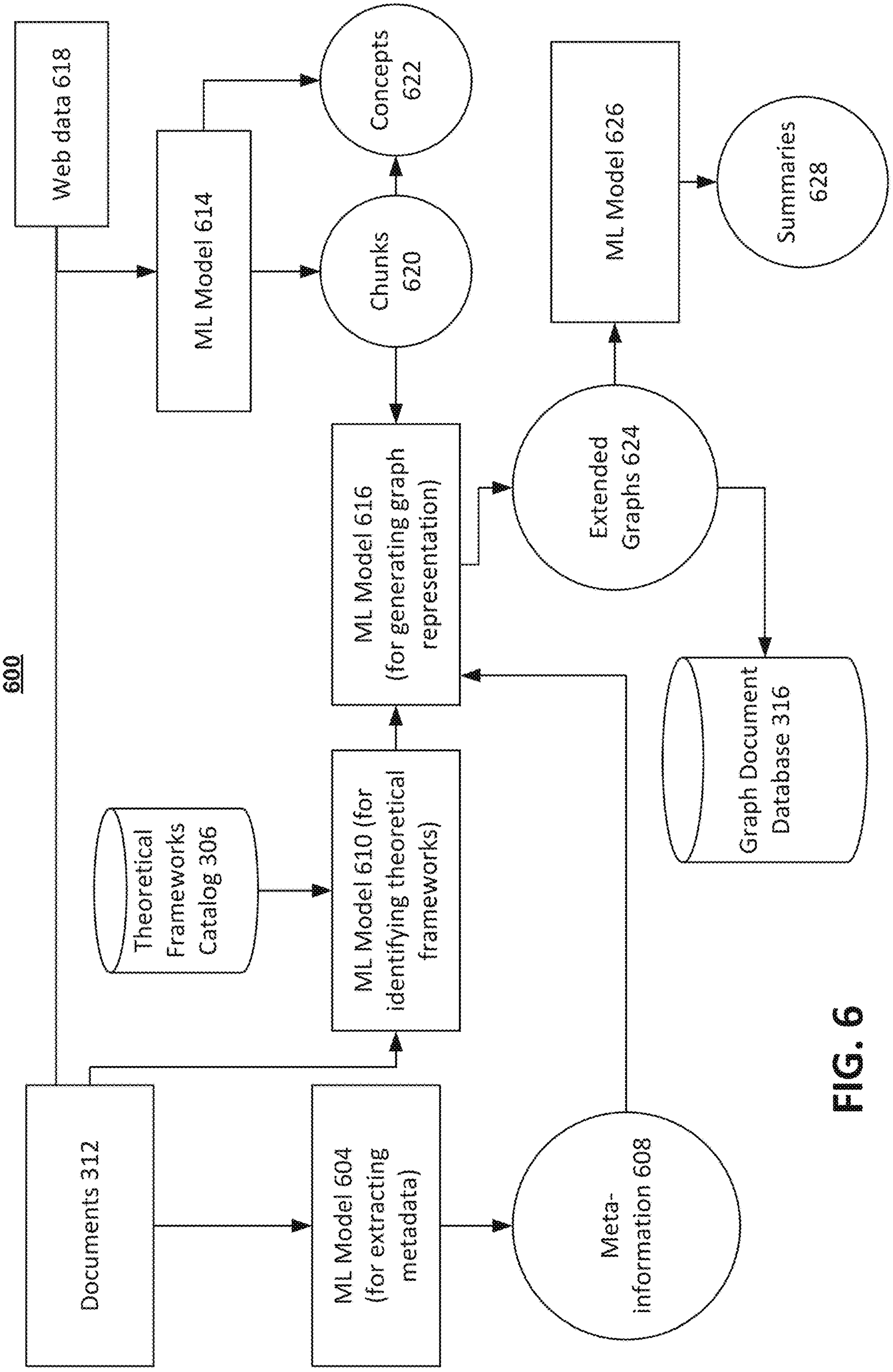
FIG. 6 illustrates a diagram of a system for scientific database generation using machine learning.

FIG. 6 illustrates a diagram of system 600 for scientific database generation using machine learning. ML model 604 is trained to extract metadata from documents 312 and generate metainformation 608, which is organized as metamodel 700 (described in FIG. 7).

ML model 610 is configured to classify the theoretical frameworks associated with each of documents 312 using the theoretical frameworks catalog 306. This process is similar to the classification of a theoretical framework performed by ML model 304, but now uses a document as an input instead of a user query.

ML model 614 is trained to divide documents 312 into smaller, manageable segments known as chunks 620. This process involves analyzing the content of each document to identify logical divisions, such as paragraphs, sections, or thematic units, that can be isolated without losing contextual integrity. Each chunk is associated with one or more concepts 622, which are derived from the document's content. These concepts represent key ideas, themes, or topics that are prevalent within the chunk, allowing for a more granular understanding of the document's subject matter. The association process involves leveraging natural language processing (NLP) techniques to extract and map relevant concepts to each chunk.

ML model 616 is configured to construct an extended graph for a given document by integrating various inputs, including metainformation 608, one or more theoretical frameworks, and the previously generated chunks 620 along with their associated concepts 622. As discussed previously, metainformation 608 encompasses metadata such as authorship, publication date, and keywords, providing a foundational context for the document. The theoretical frameworks offer a structured lens through which the document's content can be interpreted, aligning it with established academic paradigms. The chunks and concepts, representing the document's segmented content and key ideas, are mapped onto this framework, creating nodes and edges that reflect the relationships and hierarchies within the document.

This process results in a comprehensive extended graph that encapsulates the document's thematic and conceptual structure. When applied to multiple documents, ML model 616 generates a series of these extended graphs 624, which are then stored in the graph document database 316.

ML model 626 is trained to generate concise summaries 628 of community structures 406 that are identified within the extended graphs 624. These community structures represent clusters or groups of nodes within the graphs that share common characteristics or are densely interconnected, often indicating thematic or conceptual similarities across different documents. ML model 626 employs advanced graph analysis techniques to detect these communities, leveraging algorithms that can identify patterns and relationships indicative of shared topics or research areas. Once the community structures are identified, ML model 626 synthesizes the information into coherent summaries that encapsulate the essence of each community. These summaries highlight the key themes, concepts, and interconnections that define the community, providing users with a clear and accessible overview of the collective insights and trends present within the graph. This is further discussed in FIG. 8.

Figure 7:
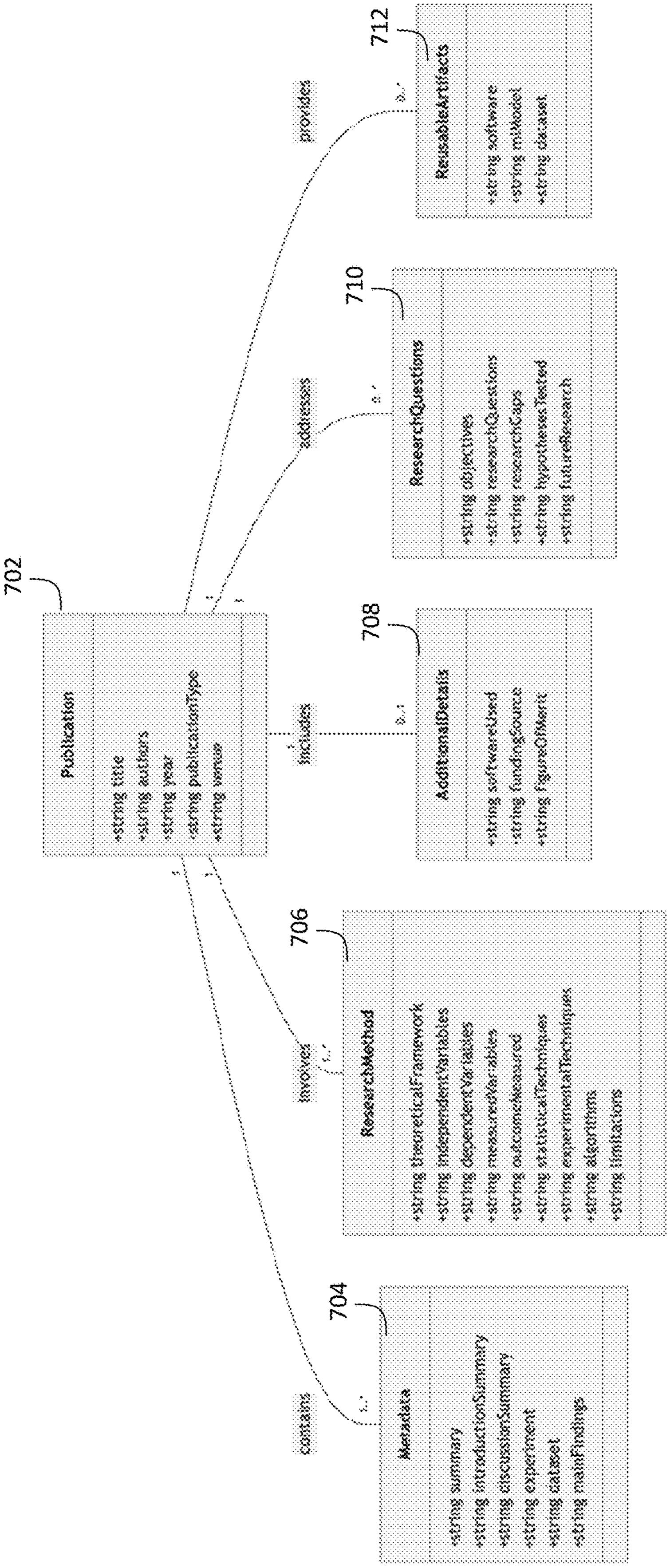
FIG. 7 illustrates a diagram of an example metamodel.

FIG. 7 illustrates a diagram of an example metamodel 700. For example, publication 702 includes various strings for "title," "authors," "year," etc. Publication 702 is connected to metadata 704, research method 706, additional details 708, research questions 710, and reusable artifacts 712. The connection between publication 702 and each of portions 704-712 is labeled. For example, publication 702 "contains" metadata 704, "involves" research method 706, "includes" additional details, "addresses" research questions 710, and "provides" reusable artifacts 712.

Figure 8:
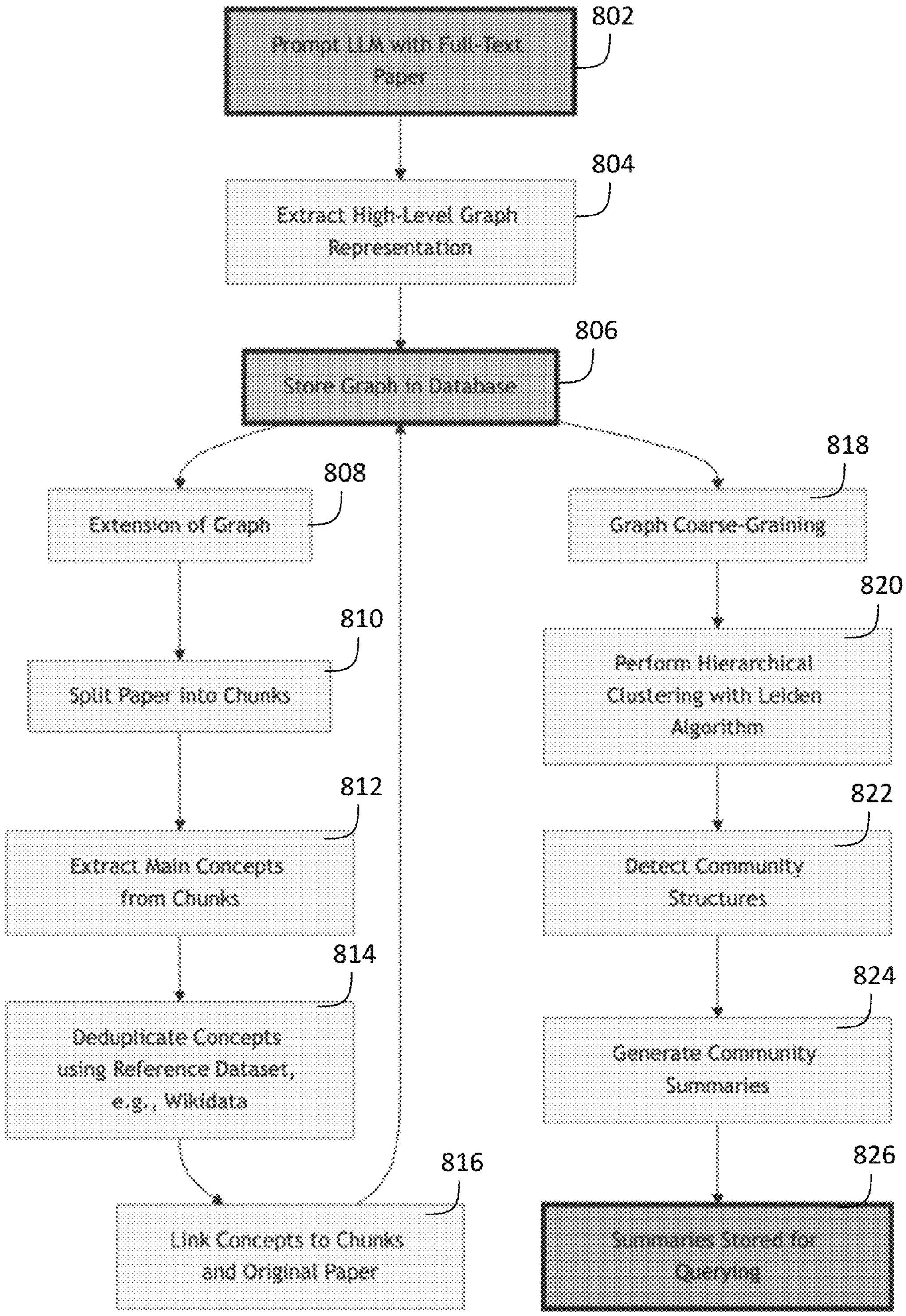
FIG. 8 illustrates a flow diagram for graph document database building.

FIG. 8 illustrates a flow diagram 800 for graph document database building.

At 802, an LLM (e.g., ML model 314) is prompted with full-text papers to extract graph representations.

At 804, ML model 616 extracts high-level graph representations.

At 806, ML model 616 stores the graphs (e.g., extended graphs 402) in graph document database 316.

From here, there are two approaches. For example, at 808, extension of the graphs may be performed where papers are chunked (e.g., chunks 408), and concepts (e.g., concepts 410) are extracted, deduplicated, and linked to the database. In the other approach, at 818, system 300 performs graph coarse-graining in which system 600 uses hierarchical clustering to detect community structures (e.g., community structures 406), and summaries are generated for querying.

In the first approach, at 810, ML model 614 splits each paper into chunks 620, and at 812, extracts main concepts 622 from it using LLM.

At 814, ML model 614 may deduplicate the concepts using shared reference dataset like web data 618 (e.g., Wikidata). At 816, ML model 614 may link each concept to the corresponding chunk and to the original paper and store the linked data in graph document database 316.

In the second approach, at 820, ML model 616 may perform hierarchical clustering and at 822, may use the clusters to detect community structures. For example, GraphRAG uses the Leiden technique to perform hierarchical clustering on the initial knowledge graphs. Leiden is a community detection algorithm that can effectively discover community structures within the graph. Entities in each cluster are assigned to different communities for more in-depth analysis. A community is a group of nodes within the graph that are densely connected to each other but sparsely connected to other dense groups in the network.

At 824, ML model 626 generates summaries 628. For example, GraphRAG generates summaries for each community and its members using a bottom-up approach. These summaries include the main entities within the community and their relationships. This step gives an overview of the entire dataset and provides useful contextual information for subsequent queries. At 826, the summaries are stored for querying.

Figure 9:
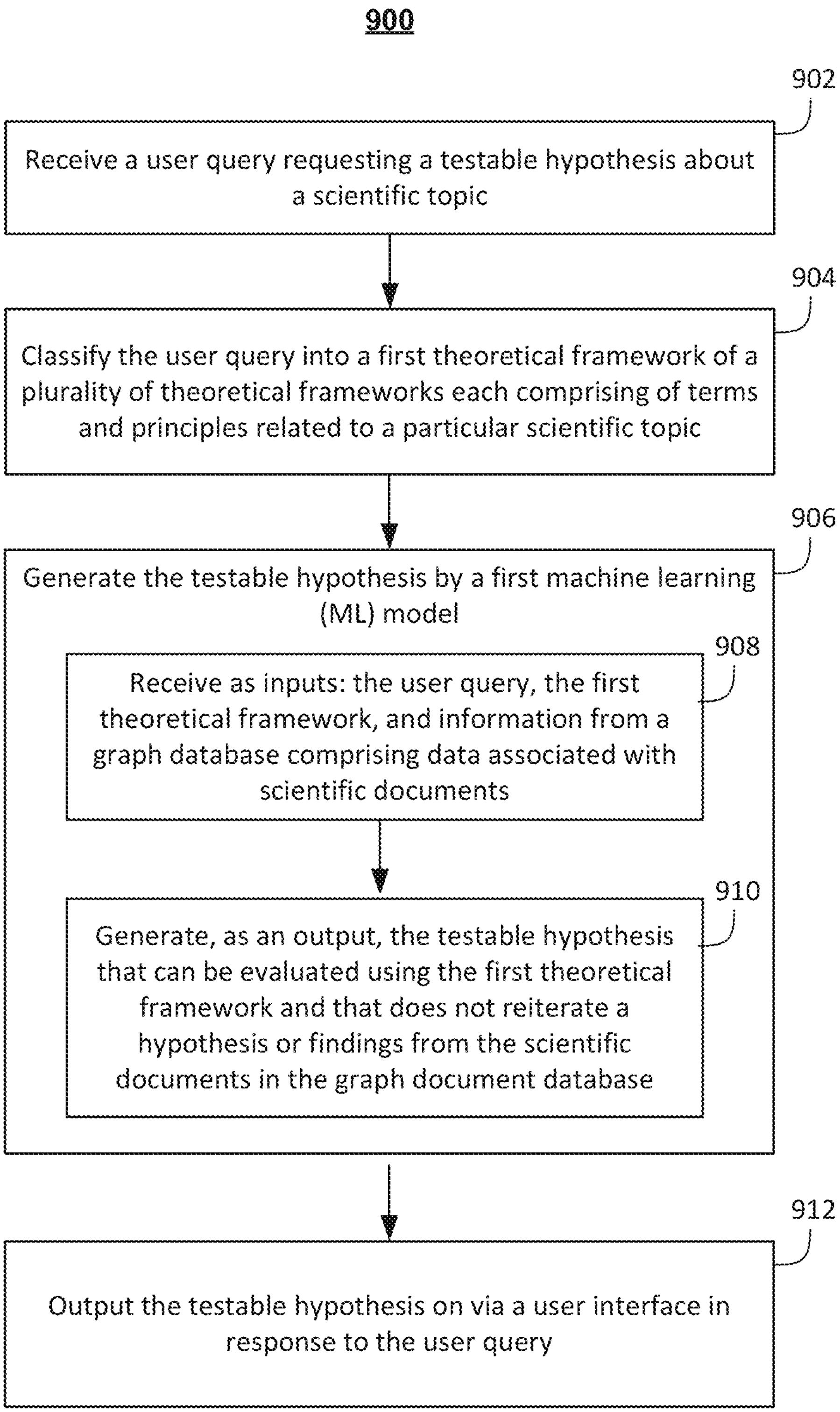
FIG. 9 illustrates a flow diagram of a method for hypothesis and research synthesis using machine learning.

FIG. 9 illustrates a flow diagram of method 900 for hypothesis and research synthesis using machine learning. At 902, ML model 304 receives user query 302 requesting a testable hypothesis about a scientific topic. In some aspects, the testable hypothesis 318 further comprises one or more of: a mathematical model, software code, a code library, at least one parameter of materials or elements, and at least one example of a practical application.

At 904, ML model 304 classifies user query 302 into a first theoretical framework of a plurality of theoretical frameworks (stored in theoretical frameworks catalog) each comprising of terms and principles related to a particular scientific topic. In some aspects, the first theoretical framework is manually selected by a user or is introduced by the user for inclusion in theoretical frameworks catalog 306. This enables added customizability.

At 906, ML model 308 generates the testable hypothesis 318. More specifically, step 906 includes steps 908 and 910 performed by ML model 308. For example, at 908, ML model 308 receives as inputs: the user query 302, the first theoretical framework, and information from a graph document database 316 comprising data associated with scientific documents 312.

At 910, ML model 308 generates, as an output, the testable hypothesis 318 that can be evaluated using the first theoretical framework and that does not reiterate a hypothesis or findings from the scientific documents 312 in the graph document database 316. This is a balancing act as the testable hypothesis 318 should not reiterate hypotheses or findings (i.e., should be different from anything proposed or confirmed previously), but should also not say anything completely outlandish or impossible. The first theoretical framework is used to prevent the testable hypothesis from being unreasonable and grounds the ML model 308 from fantastical proposals/theories.

For instance, if the scientific documents 312 in the graph document database 316 have extensively covered the effects of a specific drug on heart disease, the ML model might generate a hypothesis exploring the drug's impact on a related but distinct condition, such as diabetes, while ensuring it aligns with the principles of the first theoretical framework. This framework acts as a guiding structure, ensuring that the hypothesis remains within the realm of scientific plausibility. For example, if the framework is based on biochemical interactions, the hypothesis might propose a new pathway through which the drug could influence metabolic processes, rather than suggesting an unrelated or biologically implausible effect. By doing so, the ML model 308 ensures that the generated hypothesis is both novel and scientifically viable, ready for further exploration and testing.

In some aspects, ML model 308 is trained using a training dataset comprising a plurality of user queries and corresponding hypotheses that are novel relative to historical scientific documents in a training graph document database. In some aspects, ML model 308 is trained using reinforcement learning such that an agent in the reinforcement learning rewards hypotheses that are dissimilar to existing hypotheses, but are supported by the first theoretical framework (i.e., does not include statements that contradict principles of the first theoretical framework).

For example, if existing hypotheses in the graph document database 316 have explored the genetic factors influencing Alzheimer's disease, the agent might reward a hypothesis that investigates environmental factors, provided it aligns with the established theoretical framework. This framework might include principles such as the role of oxidative stress in neurodegeneration. The agent would thus favor hypotheses that propose new environmental triggers for oxidative stress, rather than those that contradict known biochemical pathways. By rewarding such innovative yet plausible hypotheses, the reinforcement learning agent encourages the ML model to explore uncharted territories within the boundaries of scientific credibility, fostering the generation of hypotheses that are both groundbreaking and theoretically sound.

In some aspects, ML model 308 employs a combination of natural language processing (NLP) and mathematical similarity measures to determine the similarity between the testable hypothesis and preexisting hypotheses or conclusions. For example, ML model 308 may convert both the new hypothesis and existing hypotheses into vector representations using techniques such as word embeddings or sentence embeddings, which capture semantic meanings. ML model 308 may then calculate the cosine similarity between these vectors, a mathematical measure that quantifies the cosine of the angle between two vectors in a multi-dimensional space. A cosine similarity score close to 1 indicates high similarity, while a score near 0 suggests dissimilarity.

In some aspects, ML model 308 may apply clustering algorithms, such as k-means, to group similar hypotheses and identify outliers. By setting a threshold for similarity, ML model 308 can effectively filter out hypotheses that are too similar to existing ones, ensuring that the generated hypothesis is novel while still being grounded in the theoretical framework. This mathematical approach allows ML model 308 to systematically and quantitatively assess the uniqueness of the hypothesis in relation to the existing body of knowledge.

In some aspects, ML model 308 is a large language model configured to access the graph document database 316 using Graph Retrieval Augmented Generation (G-RAG). In some aspects, the graph document database 316 is periodically updated with newer scientific documents.

At 912, ML model 308 outputs the testable hypothesis via a user interface in response to the user query.

In some aspects, ML model 310 generates a summary of related works (e.g., overview 320). ML model 310 parses the data associated with the scientific documents 312 in the graph document database 316. The summary of related works may include hypotheses and research plans or/and methods described in the scientific documents 312 related to the testable hypothesis 318. ML model 310 may output the summary of related works on the user interface.

In some aspects, ML model 322 may generate a research plan 324 for testing the testable hypothesis 318. ML model 322 receives, as inputs, the summary of related works (e.g., overview 320) and the testable hypothesis 318, and generates, as an output, the research plan 324 comprising a procedure and techniques for testing the testable hypothesis. ML model 322 may output the research plan 324 on the user interface.

In some aspects, the research plan 324 further comprises a list of literature to support or refute the testable hypothesis 318.

Figure 10:
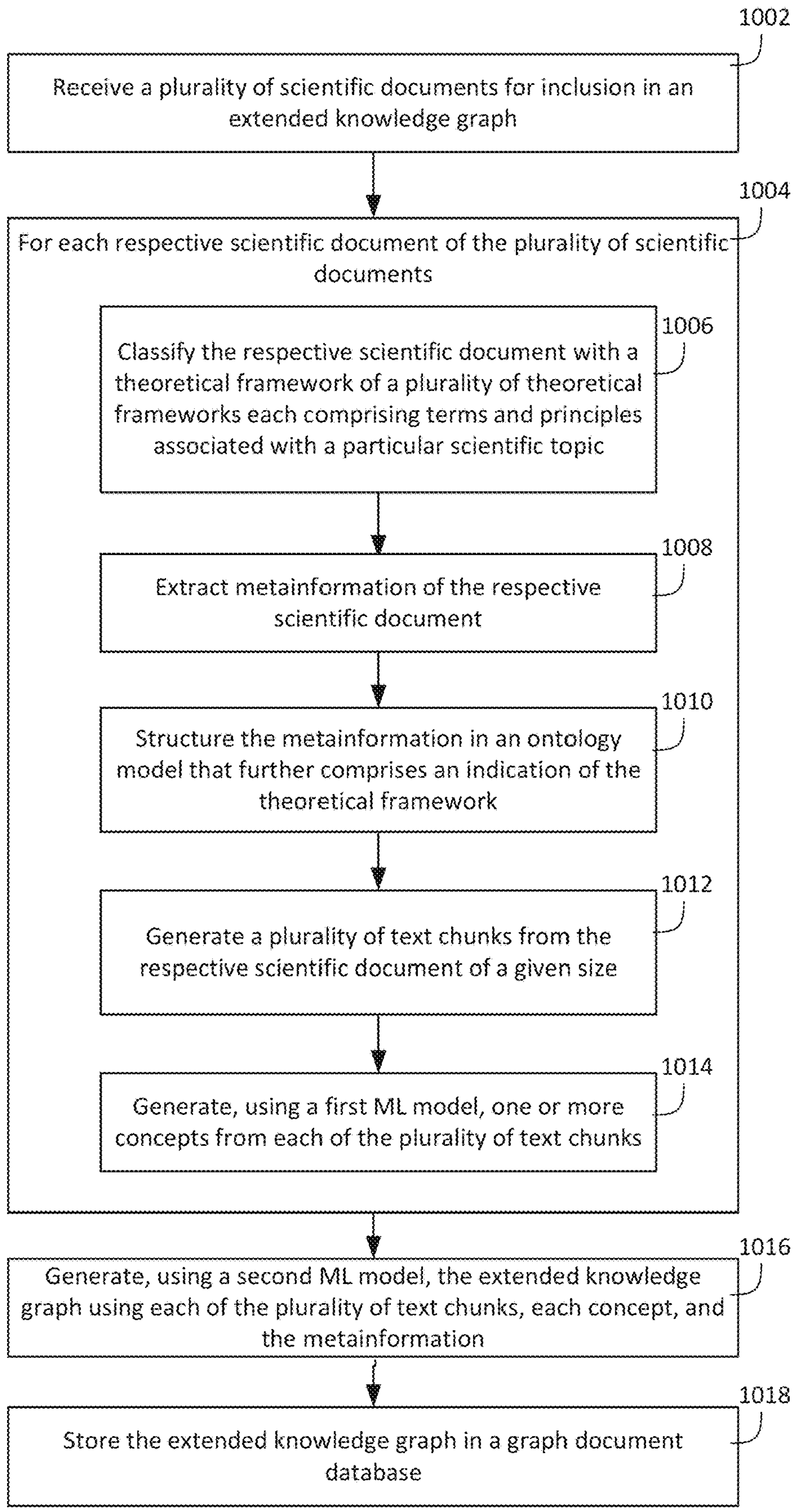
FIG. 10 illustrates a flow diagram of a method for scientific database generation using machine learning.

FIG. 10 illustrates a flow diagram of method 1000 for scientific database generation using machine learning. At 1002, ML model 610 receives a plurality of scientific documents 312 for inclusion in an extended knowledge graph (e.g., part of extended graphs 624).

Step 1004 includes steps 1006-1014, which are performed for each respective scientific document of the plurality of scientific documents 312.

For example, at 1006, ML model 610 classifies the respective scientific document with a theoretical framework of a plurality of theoretical frameworks each comprising terms and principles associated with a particular scientific topic.

At 1008, ML model 604 extracts metainformation 608 of the respective scientific document.

At 1010, ML model 604 structures the metainformation 608 in a document-specific ontology model (e.g., ontology model 200 or metamodel 700) that further comprises an indication of the theoretical framework.

At 1012, ML model 614 generates a plurality of text chunks 620 from the respective scientific document of a given size. For example, the given size may be a certain amount of characters, lines, paragraphs, etc. In some aspects, the given size may be a size taken in memory (e.g., 2 KB).

At 1014, ML model 614 generates one or more concepts 622 from each of the plurality of text chunks. For example, if a chunk is a paragraph primarily about the Pythagorean theorem, ML model 614 may determine the concept to be Pythagorean theorem. In some aspects, a single chunk may have multiple concepts. In some aspects, identifying the concepts may involve keyword detection and classification of said keywords.

At 1016, ML model 616 generates the extended knowledge graph using each of the plurality of text chunks 620, each concept 622, and the metainformation 608.

At 1018, the extended knowledge graph (e.g., each of extended graphs 624) is stored by the system 600 in a graph document database 316. In some aspects, system 600 and system 300 are connected.

In some aspects, nodes of the extended knowledge graph comprise each of the plurality of text chunks, each concept, and the metainformation. The relationships captured in each document-specific ontology model are mapped to edges of the extended knowledge graph.

In some aspects, ML model 626 may perform hierarchical clustering on the extended knowledge graph to identify a plurality of community structures. A community structure is a group of nodes densely connected to each other but sparsely connected to other densely connected nodes in a graph.

In some aspects, ML model 626 may generate a summary for each community structure of the plurality of community structures. In FIG. 6, summaries 628 represents all summaries generated. In particular, a summary is indicative of entities in a given community structure and relationships within the given community structure. System 600 stores each summary in the graph document database 316.

In some aspects, a large language model (LLM), configured to answer user queries, accesses content of the extended knowledge graph when generating responses. The LLM may utilize Retrieval Augmented Generation (RAG) to access the content.

In some aspects, ML model 616 may de-duplicate matching concepts between multiple scientific documents of the plurality of scientific documents using shared reference dataset. For example, the de-duplication process performed by ML model 616 may involve identifying and consolidating matching concepts across multiple scientific documents by leveraging a shared reference dataset like Wikidata. On a technical level, this process begins with the extraction of key concepts from each document using natural language processing (NLP) techniques. These concepts are then mapped to entities in the shared reference dataset, such as Wikidata, which provides a structured and comprehensive repository of information. For example, if multiple documents refer to "CRISPR-Cas9" as a gene-editing tool, model 616 identifies this concept and links it to the corresponding Wikidata entry.

Once the concepts are mapped, model 616 uses entity resolution techniques to identify duplicates. This involves comparing the attributes and relationships of the mapped entities to determine equivalence. For instance, if two documents describe "CRISPR-Cas9" with slightly different terminologies or contexts, the model assesses their similarity based on the attributes stored in Wikidata, such as its function, applications, and related biological processes.

In some aspects, the de-duplication may further be refined using algorithms like fuzzy matching and semantic similarity measures, which account for variations in terminology and context. By applying these techniques, the model can accurately identify and merge duplicate concepts, ensuring that each unique concept is represented only once across the dataset. This consolidation not only reduces redundancy but also enhances the coherence and accessibility of the information, allowing researchers to access a unified view of the scientific knowledge contained within the documents.

In some aspects, all ML models shown in FIG. 6 and FIG. 3 are each large language models.

HypoFinder represents a significant leap forward in automating scientific research processes. It provides a tool that streamlines the selection of formalism, hypothesis generation, literature review, and research plan synthesis, aiding in bridging the gap between seemingly disjointed scientific domains. By reducing fragmentation of scientific branches and finding similarities and correspondences between different scientific facets, the systems and methods of the present disclosure pave the way for accelerated scientific discoveries and advancements.

Figure 11:
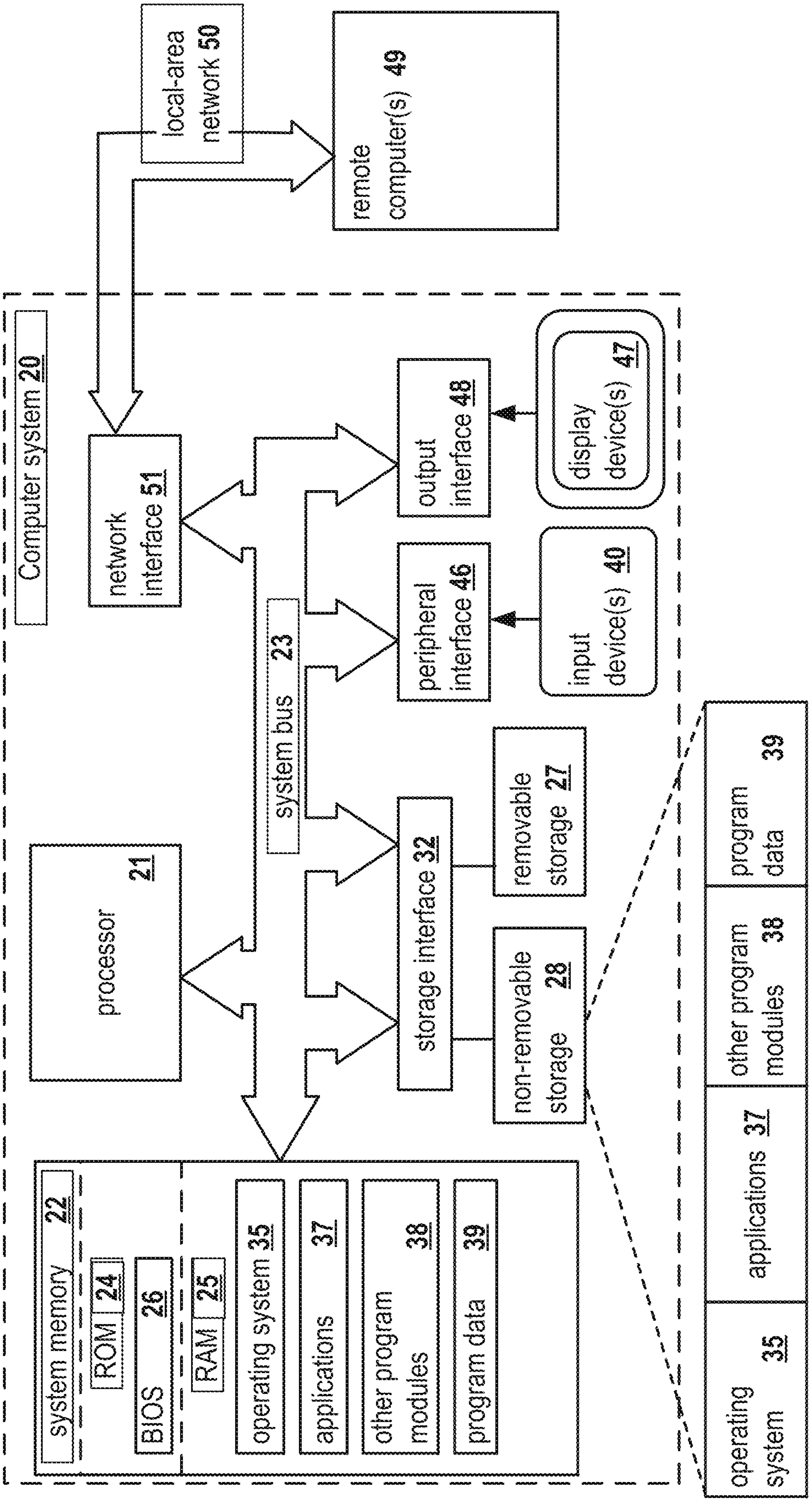
FIG. 11 presents an example of a general-purpose computer system on which aspects of the present disclosure can be implemented.

FIG. 11 is a block diagram illustrating a computer system 20 on which aspects of systems and methods for hypothesis and research synthesis using machine learning may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-10 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for database generation for automated scientific inquiry using machine learning (ML), the method comprising:

receiving, by at least one hardware processor, a plurality of scientific documents for inclusion in an extended knowledge graph;

for each respective scientific document of the plurality of scientific documents:

classifying, by the at least one hardware processor executing a document classification ML model, the respective scientific document with a theoretical framework of a plurality of theoretical frameworks each comprising terms and principles associated with a particular scientific topic;

extracting, using a metadata extraction ML model, metainformation of the respective scientific document, the metainformation comprising one or more of: problem formulation, scientific context, formalism, suggested method, baseline methods, metric for result assessment, or results summary;

structuring the metainformation in a document-specific ontology model that further comprises an indication of the theoretical framework, wherein the document-specific ontology model defines hierarchical relationships between entities including topics, events, assessments, and reusable artifacts extracted from the respective scientific document;

generating, by a chunking ML model, a plurality of text chunks from the respective scientific document of a given size;

generating, using a first ML model, one or more concepts from each of the plurality of text chunks, wherein each concept represents a key idea or theme prevalent within a respective text chunk and is identified using natural language processing (NLP) techniques to extract and map relevant concepts to each text chunk;

generating, using a second ML model, the extended knowledge graph using each of the plurality of text chunks, each concept, and the metainformation, wherein the second ML model constructs the extended knowledge graph by integrating the metainformation, one or more theoretical frameworks, and the text chunks along with their associated concepts to create nodes and edges that reflect relationships and hierarchies within the respective scientific document; and de-duplicating matching concepts between multiple scientific documents of the plurality of scientific documents using a shared reference dataset by mapping extracted concepts to entities in the shared reference dataset and applying entity resolution techniques to identify and consolidate duplicate concepts across the plurality of scientific documents; and storing the extended knowledge graph in a graph document database, wherein nodes of the extended knowledge graph comprise each of the plurality of text chunks, each concept, and the metainformation, and wherein relationships captured in each document-specific ontology model are mapped to edges of the extended knowledge graph.

2. The method of claim 1, further comprising:

performing hierarchical clustering on the extended knowledge graph to identify a plurality of community structures, wherein a community structure is a group of nodes densely connected to each other but sparsely connected to other densely connected nodes in the extended knowledge graph, and wherein the hierarchical clustering employs a community detection algorithm to assign entities in each cluster to different communities.

3. The method of claim 2, further comprising:

generating, by a third ML model, a summary for each community structure of the plurality of community structures using a bottom-up approach, wherein the summary is indicative of entities in a given community structure and relationships within the given community structure, and wherein the summary provides contextual information for subsequent queries against the graph document database; and storing each summary in the graph document database.

4. The method of claim 1, wherein a large language model (LLM), configured to answer user queries, accesses content of the extended knowledge graph when generating responses using Graph Retrieval Augmented Generation (G-RAG), wherein the LLM executes one of:

a global search workflow that uses community summaries generated from a specified level of a community hierarchy to reason about holistic questions related to a data corpus, wherein community reports are divided into batches, intermediate responses are generated and rated, and aggregated intermediate responses are used to generate a final reply; or a local search workflow that identifies entities from the extended knowledge graph semantically related to a user input using a vector database to conduct text similarity searches, extracts relationships and covariates of the identified entities, and integrates community reports to construct a response.

5. The method of claim 1, wherein the metadata extraction ML model extracts the metainformation using LLM-assisted information extraction with a template-based prompting technique, and wherein extracted metainformation is partially validated using human assessments that are used for fine-tuning of the metadata extraction ML model.

6. The method of claim 1, wherein the shared reference dataset comprises a structured and comprehensive repository of information, and wherein the entity resolution techniques compare attributes and relationships of mapped entities to determine equivalence.

7. The method of claim 1, wherein constructing the extended knowledge graph further comprises: for each document, generating a series of extended graphs that encapsulate the thematic and conceptual structure of each respective scientific document, and storing the series of extended graphs in the graph document database.

8. A system for database generation for automated scientific inquiry using machine learning (ML), comprising:

at least one memory storing a plurality of ML models;

at least one hardware processor coupled with the at least one memory and configured, individually or in combination, to:

receive a plurality of scientific documents for inclusion in an extended knowledge graph;

for each respective scientific document of the plurality of scientific documents:

classify, by executing a document classification ML model, the respective scientific document with a theoretical framework of a plurality of theoretical frameworks each comprising terms and principles associated with a particular scientific topic;

extract, using a metadata extraction ML model, metainformation of the respective scientific document, the metainformation comprising one or more of: problem formulation, scientific context, formalism, suggested method, baseline methods, metric for result assessment, or results summary;

structure the metainformation in a document-specific ontology model that further comprises an indication of the theoretical framework, wherein the document-specific ontology model defines hierarchical relationships between entities including topics, events, assessments, and reusable artifacts extracted from the respective scientific document;

generate, by a chunking ML model, a plurality of text chunks from the respective scientific document of a given size;

generate, using a first ML model, one or more concepts from each of the plurality of text chunks, wherein each concept represents a key idea or theme prevalent within a respective text chunk and is identified using natural language processing (NLP) techniques to extract and map relevant concepts to each text chunk;

generate, using a second ML model, the extended knowledge graph using each of the plurality of text chunks, each concept, and the metainformation, wherein the second ML model constructs the extended knowledge graph by integrating the metainformation, one or more theoretical frameworks, and the text chunks along with their associated concepts to create nodes and edges that reflect relationships and hierarchies within the respective scientific document;

de-duplicate matching concepts between multiple scientific documents of the plurality of scientific documents using a shared reference dataset by mapping extracted concepts to entities in the shared reference dataset and applying entity resolution techniques to identify and consolidate duplicate concepts across the plurality of scientific documents; and store the extended knowledge graph in a graph document database, wherein nodes of the extended knowledge graph comprise each of the plurality of text chunks, each concept, and the metainformation, and wherein relationships captured in each document-specific ontology model are mapped to edges of the extended knowledge graph.

9. The system of claim 8, wherein the at least one hardware processor is configured to:

perform hierarchical clustering on the extended knowledge graph to identify a plurality of community structures, wherein a community structure is a group of nodes densely connected to each other but sparsely connected to other densely connected nodes in the extended knowledge graph, and wherein the hierarchical clustering employs a community detection algorithm to assign entities in each cluster to different communities.

10. The system of claim 9, wherein the at least one hardware processor is configured to:

generate, by a third ML model, a summary for each community structure of the plurality of community structures using a bottom-up approach, wherein the summary is indicative of entities in a given community structure and relationships within the given community structure, and wherein the summary provides contextual information for subsequent queries against the graph document database; and store each summary in the graph document database.

11. The system of claim 8, wherein a large language model (LLM), configured to answer user queries, accesses content of the extended knowledge graph when generating responses using Graph Retrieval Augmented Generation (G-RAG), wherein the LLM executes one of:

a global search workflow that uses community summaries generated from a specified level of a community hierarchy to reason about holistic questions related to a data corpus, wherein community reports are divided into batches, intermediate responses are generated and rated, and aggregated intermediate responses are used to generate a final reply; or a local search workflow that identifies entities from the extended knowledge graph semantically related to a user input using a vector database to conduct text similarity searches, extracts relationships and covariates of the identified entities, and integrates community reports to construct a response.

12. The system of claim 8, wherein the metadata extraction ML model extracts the metainformation using LLM-assisted information extraction with a template-based prompting technique, and wherein extracted metainformation is partially validated using human assessments that are used for fine-tuning of the metadata extraction ML model.

13. The system of claim 8, wherein the shared reference dataset comprises a structured and comprehensive repository of information, and wherein the entity resolution techniques compare attributes and relationships of mapped entities to determine equivalence.

14. The system of claim 8, wherein constructing the extended knowledge graph further comprises: for each document, generating a series of extended graphs that encapsulate the thematic and conceptual structure of each respective scientific document, and storing the series of extended graphs in the graph document database.

15. A non-transitory computer readable medium storing thereon computer executable instructions for database generation for automated scientific inquiry using machine learning (ML), including instructions for:

receiving, by at least one hardware processor, a plurality of scientific documents for inclusion in an extended knowledge graph;

for each respective scientific document of the plurality of scientific documents:

classifying, by the at least one hardware processor executing a document classification ML model, the respective scientific document with a theoretical framework of a plurality of theoretical frameworks each comprising terms and principles associated with a particular scientific topic;

extracting, using a metadata extraction ML model, metainformation of the respective scientific document, the metainformation comprising one or more of: problem formulation, scientific context, formalism, suggested method, baseline methods, metric for result assessment, or results summary;

structuring the metainformation in a document-specific ontology model that further comprises an indication of the theoretical framework, wherein the document-specific ontology model defines hierarchical relationships between entities including topics, events, assessments, and reusable artifacts extracted from the respective scientific document;

generating, by a chunking ML model, a plurality of text chunks from the respective scientific document of a given size;

generating, using a first ML model, one or more concepts from each of the plurality of text chunks, wherein each concept represents a key idea or theme prevalent within a respective text chunk and is identified using natural language processing (NLP) techniques to extract and map relevant concepts to each text chunk;

generating, using a second ML model, the extended knowledge graph using each of the plurality of text chunks, each concept, and the metainformation, wherein the second ML model constructs the extended knowledge graph by integrating the metainformation, one or more theoretical frameworks, and the text chunks along with their associated concepts to create nodes and edges that reflect relationships and hierarchies within the respective scientific document; and de-duplicating matching concepts between multiple scientific documents of the plurality of scientific documents using a shared reference dataset by mapping extracted concepts to entities in the shared reference dataset and applying entity resolution techniques to identify and consolidate duplicate concepts across the plurality of scientific documents; and storing the extended knowledge graph in a graph document database, wherein nodes of the extended knowledge graph comprise each of the plurality of text chunks, each concept, and the metainformation, and wherein relationships captured in each document-specific ontology model are mapped to edges of the extended knowledge graph.

16. The non-transitory computer readable medium of claim 15, further comprising:

performing hierarchical clustering on the extended knowledge graph to identify a plurality of community structures, wherein a community structure is a group of nodes densely connected to each other but sparsely connected to other densely connected nodes in the extended knowledge graph, and wherein the hierarchical clustering employs a community detection algorithm to assign entities in each cluster to different communities.

17. The non-transitory computer readable medium of claim 15, further comprising instructions for:

generating, by a third ML model, a summary for each community structure of the plurality of community structures using a bottom-up approach, wherein the summary is indicative of entities in a given community structure and relationships within the given community structure, and wherein the summary provides contextual information for subsequent queries against the graph document database; and storing each summary in the graph document database.

18. The non-transitory computer readable medium of claim 15, wherein a large language model (LLM), configured to answer user queries, accesses content of the extended knowledge graph when generating responses using Graph Retrieval Augmented Generation (G-RAG), wherein the LLM executes one of:

a global search workflow that uses community summaries generated from a specified level of a community hierarchy to reason about holistic questions related to a data corpus, wherein community reports are divided into batches, intermediate responses are generated and rated, and aggregated intermediate responses are used to generate a final reply; or a local search workflow that identifies entities from the extended knowledge graph semantically related to a user input using a vector database to conduct text similarity searches, extracts relationships and covariates of the identified entities, and integrates community reports to construct a response.

19. The non-transitory computer readable medium of claim 15, wherein the metadata extraction ML model extracts the metainformation using LLM-assisted information extraction with a template-based prompting technique, and wherein extracted metainformation is partially validated using human assessments that are used for fine-tuning of the metadata extraction ML model.

* * * * *